(12) United States Patent
Black

(10) Patent No.: US 7,606,234 B2
(45) Date of Patent: Oct. 20, 2009

(54) MULTI-STREAM ACKNOWLEDGEMENT SCHEDULING

(75) Inventor: Richard John Black, Cambridge (GB)

(73) Assignee: Microsoft Corporation, Redmond, WA (US)

(*) Notice: Subject to any disclaimer, the term of this patent is extended or adjusted under 35 U.S.C. 154(b) by 682 days.

(21) Appl. No.: 11/153,721

(22) Filed: Jun. 14, 2005

(65) Prior Publication Data

US 2007/0002863 A1 Jan. 4, 2007

(51) Int. Cl.
*H04L 12/56* (2006.01)

(52) U.S. Cl. .................. 370/394; 370/414; 370/418

(58) Field of Classification Search .......... 370/412, 370/235, 394, 468, 428, 414, 418
See application file for complete search history.

(56) References Cited

U.S. PATENT DOCUMENTS

| | | | | |
|---|---|---|---|---|
| 5,612,950 | A * | 3/1997 | Young | 370/276 |
| 6,247,061 | B1 * | 6/2001 | Douceur et al. | 709/240 |
| 6,289,224 | B1 * | 9/2001 | Boxall et al. | 455/517 |
| 6,411,617 | B1 * | 6/2002 | Kilkki et al. | 370/353 |
| 6,553,006 | B1 * | 4/2003 | Kalliokulju et al. | 370/310 |
| 6,657,962 | B1 | 12/2003 | Barri | |
| 6,791,989 | B1 * | 9/2004 | Steinmetz et al. | 370/412 |
| 6,868,061 | B1 * | 3/2005 | Kilkki et al. | 370/230.1 |
| 6,952,402 | B1 * | 10/2005 | Crocker et al. | 370/235 |
| 7,140,016 | B2 * | 11/2006 | Milovanovic et al. | 718/100 |
| 7,251,218 | B2 * | 7/2007 | Jorgensen | 370/235 |
| 2001/0050913 | A1 * | 12/2001 | Chen et al. | 370/360 |
| 2002/0112097 | A1 * | 8/2002 | Milovanovic et al. | 709/331 |
| 2002/0141454 | A1 * | 10/2002 | Muniere | 370/535 |
| 2003/0097461 | A1 * | 5/2003 | Barham et al. | 709/235 |
| 2003/0103453 | A1 | 6/2003 | Huang | |
| 2003/0123392 | A1 * | 7/2003 | Ruutu et al. | 370/235 |
| 2003/0219026 | A1 | 11/2003 | Sun | |
| 2004/0162083 | A1 * | 8/2004 | Chen et al. | 455/454 |
| 2005/0052997 | A1 | 3/2005 | Montes Linares | |
| 2006/0140128 | A1 * | 6/2006 | Chi et al. | 370/241 |
| 2006/0264220 | A1 * | 11/2006 | Chen et al. | 455/454 |
| 2007/0002863 | A1 * | 1/2007 | Black | 370/394 |
| 2007/0081498 | A1 * | 4/2007 | Niwano | 370/335 |
| 2007/0133454 | A1 * | 6/2007 | Ware et al. | 370/328 |
| 2008/0089351 | A1 * | 4/2008 | Hu | 370/412 |

OTHER PUBLICATIONS

S. Keshav, "Congestion Control in Computer Networks," Ph.D. Thesis, published as U.C. Berkeley TR-654, Sep. 1991.
International Search Report dated May 29, 2008 for Application No. PCT/US06/23331, 8 pages.

* cited by examiner

*Primary Examiner*—Jason E Mattis

(57) ABSTRACT

Acknowledgement packets and data packets of multiple streams are reordered for transmission in order to gain good overall utilization of both uploading and downloading links. Durations of various packets in a transmit queue may evaluated to determine whether a later packet in the transmit queue can be transmitted ahead of an earlier packet in the transmit queue. A relative acknowledgement priority parameter for a node effectively tunes the amount of transmit bandwidth available to increase acknowledgment transmissions and therefore increase the node's receive rate from another node.

17 Claims, 5 Drawing Sheets

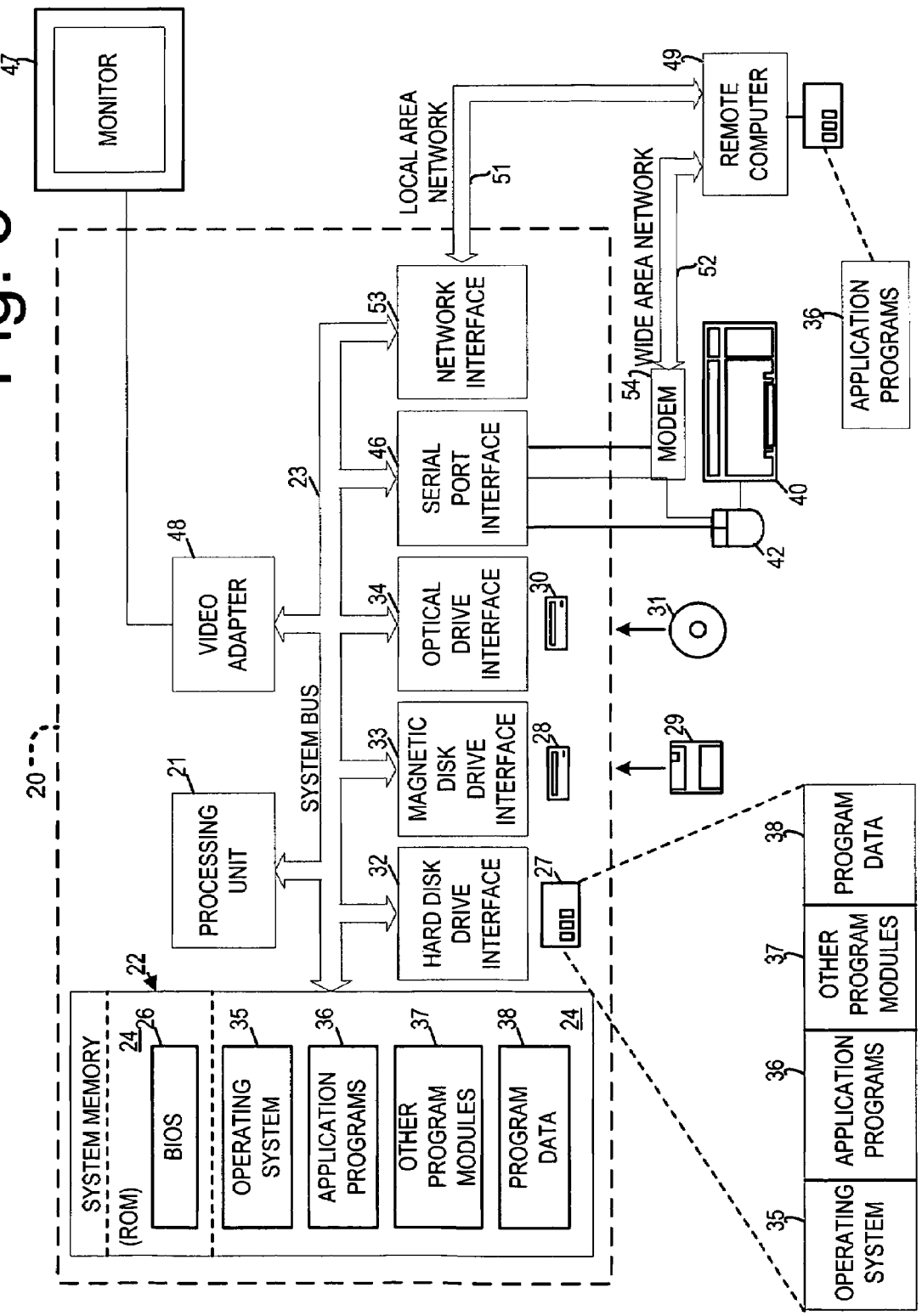

MULTI-STREAM ACKNOWLEDGEMENT SCHEDULING

TECHNICAL FIELD

The invention relates generally to network communications, and more particularly to multi-stream acknowledgement scheduling in network communications.

BACKGROUND

Many Internet users have asymmetric links to the Internet (e.g., Asymmetric Digital Subscriber Line or ADSL). For example, in ADSL, a user's downloading bandwidth is typically greater than the user's uploading bandwidth. Downloading is primarily associated with receiving data packets from the Internet; uploading is primarily associated with sending data packets to the Internet, although asymmetric links may exist in other configurations.

In many data transfer protocols, a receiving node must send a form of acknowledgement packet to indicate that a data packet has been successfully received. When the transmitting node receives the acknowledgement packet from the receiving node, it can send another data packet in the transfer sequence. In contrast, if the transmitting node does not receive an acknowledgement packet from the receiving node, it may temporarily suspend its transmission activity and/or attempt to resend a previously transmitted packet after a timeout period, under the assumption that the previous transmission was not successful. Therefore, the timing and successful receipt of acknowledgement packets can significantly affect the rate at which data is transferred from a transmitting node to a receiving node.

Furthermore, if a node of a given connection is transmitting both data packets and acknowledgements (i.e., the node is processing multiple communication streams), the operation of transmitting data, particularly large data packets, from the first node can significantly delay the transmission of acknowledgement packets from that node. Accordingly, as both the data packet transmission and the acknowledgement transmission are competing for a single transmit queue, a transmit queue busy transmitting a large data packet can reduce the rate at which the node can return acknowledgements to another transmitting node, thereby reducing the rate at which the other transmitting node will send more data packets. Therefore, transmission activity of a node can significantly impact the rate at which the node will receive data packets.

The effect of a bottleneck of acknowledgement packets at a given node, which can diminish the receive rate of traffic to that node, can be amplified by an asymmetric connection (e.g., download=1024 kbps versus upload=64 kbps). For example, when a download destination node is both receiving and transmitting data packets over a typical ADSL connection, the receiving throughput experienced by the node may be limited by the node's inability to return timely acknowledgements to the download source node—the acknowledgements from the downloading destination node are competing with uploading data packets from the same node for the smaller bandwidth of the upload link (as compared to the download link). Therefore, the throughput through the larger download connection can be degraded by this bottleneck in the upload connection.

SUMMARY

Implementations described and claimed herein address the foregoing problems by scheduling the order and timing at which both acknowledgement packets and data packets of multiple streams may be sent by a transmitting node in order to gain good overall utilization of both uploading link and the downloading link. In one implementation, durations of various packets in a transmit queue are evaluated to determine whether a later packet in the transmit queue can be transmitted ahead of an earlier packet in the transmit queue without too much impact on the transmit rate. A relative acknowledgement priority parameter for a node effectively tunes the amount of transmit bandwidth available to be used to increase acknowledgment transmission rates and therefore increase the node's receive rate from another node.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

FIG. 5 illustrates a system that may be useful in implementing the described technology.

DETAILED DESCRIPTIONS

Figure 1:
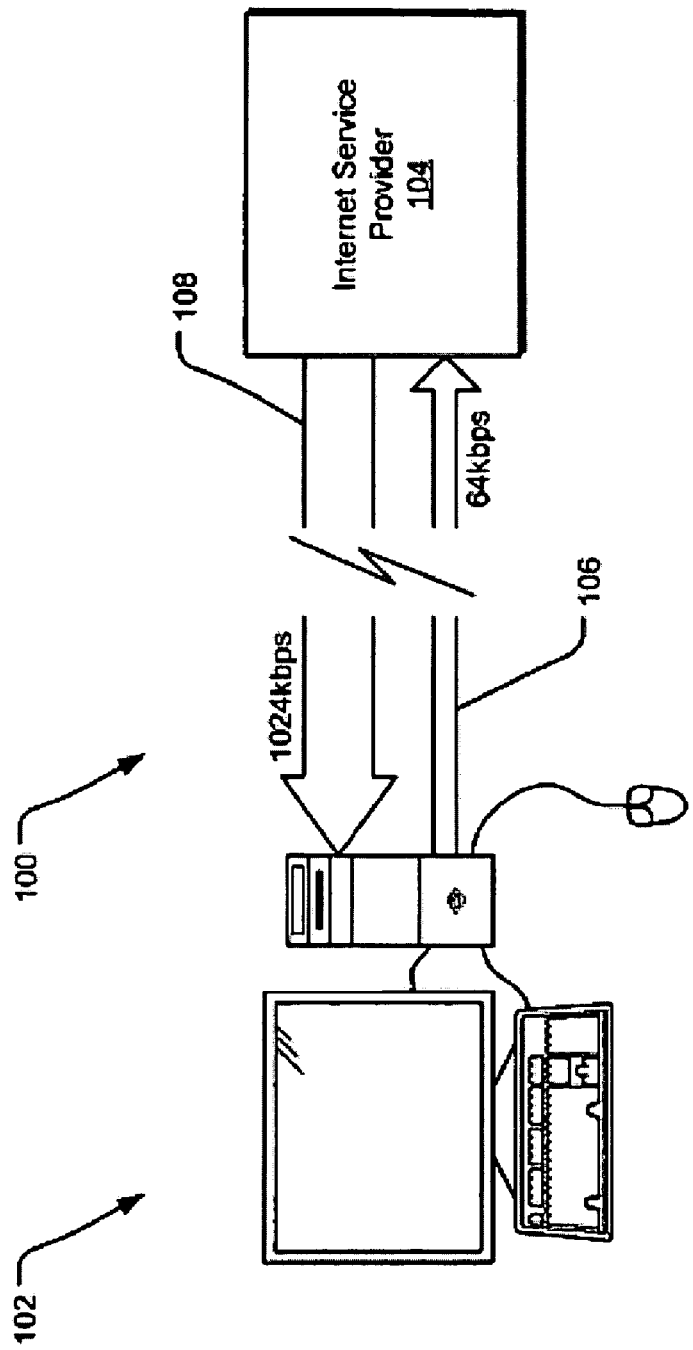
FIG. 1 illustrates asymmetric network links with exemplary multi-stream acknowledgement scheduling.

FIG. 1 illustrates asymmetric network links 100 with exemplary multi-stream acknowledgement scheduling. A computer system 102 (e.g., an upload source) is configured with Internet access through the asymmetric network links 100 to an Internet service provider (ISP) 104 (e.g., a download source), a common configuration for a home user having ADSL service. In the illustrated implementation, the asymmetric network link 100 includes an upload link 106 having a bandwidth of 64 kbps, and a download link 108 having a bandwidth of 1024 kbps, although other rates are also contemplated. It should be understood that multi-stream acknowledgement scheduling may also be employed in a symmetric network link configuration.

Each link may include one or more flows with a portion of the link's bandwidth allocated to each flow. For example, a link may include a connection-related flow with 80% of the total bandwidth of the link and a non-connection-related flow with 20% of the total bandwidth of the link. Applying these exemplary allocations to the case of the asymmetric network links 100, the transmit rate of the connection-related flow in the uploading link 106 might therefore be about 52 kbps and the receive rate of the connection-related flow in the downloading link 108 might be about 820 kbps.

There may also be multiple streams operative within a given flow. For example, within a given connection-related flow, there may be one connection or stream downloading a digital video stream from a content providing website and a second connection uploading digital images to a personal photo album website. As connection-related streams, each of these streams share the bandwidth allocated to the connection-related flows within the upload link 106 and the download link 108.

The computer system 102 includes software that provides multi-stream acknowledgement scheduling for its network communications. As the computer system 102 (e.g., a receiving node) receives downloaded data packets from the ISP 104 (e.g., a transmitting node), the computer system's network stack generates acknowledgement packets to be sent back to the ISP 104. An acknowledgement packet informs the transmitting node at the ISP 104 that the receiving node received a previously transmitted data packet and is available to receive another data packet. In response to receipt of an acknowledgement packet, the transmitting node can send a subsequent packet in the stream, if any. As such, acknowledgement packets act as a throttle on the downloaded data packets—if the transmitting node does not receive acknowledgement packets quickly enough, the rate at which the transmitting node sends data packets may be reduced.

It should be understood that some packets can contain both data and one or more acknowledgements. Such packets are also termed "acknowledgement packets" because they acknowledge receipt of one or more packets containing data and signal the transmitter to transmit new packets. Acknowledgment packets typically indicate an amount of data acknowledged, and therefore, an amount of data that can be transmitted to the receiving node by the transmitting node.

The impact of the acknowledgement rate on the receive rate can be amplified by an asymmetric network service when multiple streams are being communicated over a given flow. In the example of concurrent download (e.g., digital video) and upload (digital images) streams, the two streams are competing for a smaller "pipe" on the upload side—the upload stream is transmitting data and the download stream is transmitting acknowledgements. As such, the downloading data, despite the large bandwidth available in the downloading link 108, may be slowed by a bottleneck in the uploading link 106, which can be saturated with a combination of data packets and acknowledgement packets of multiple streams.

To relieve the bottleneck, a multi-stream acknowledgment scheduler module implemented in a packet scheduler driver associated with the network stack can reorder acknowledgement packets in one stream relative to data packets in an alternative stream. For example, a transmit queue of the uploading source 102 may have an acknowledgement packet of the downloading stream queued behind a large data packet of an uploading stream. As such, the acknowledgement packet of the downloading stream may be delayed while the data packet is transmitted over the slower upload link 106. Meanwhile, the downloading stream is not transmitting additional data, because it awaits the acknowledgement, despite the fact that the computer system 102 is ready for additional downloading data. In contrast, reordering the acknowledgement packet in front of the large data packet allows the downloading stream to receive the acknowledgement for which it is waiting and therefore, the downloading stream can initiate a subsequent transmitted packet.

Figure 2:
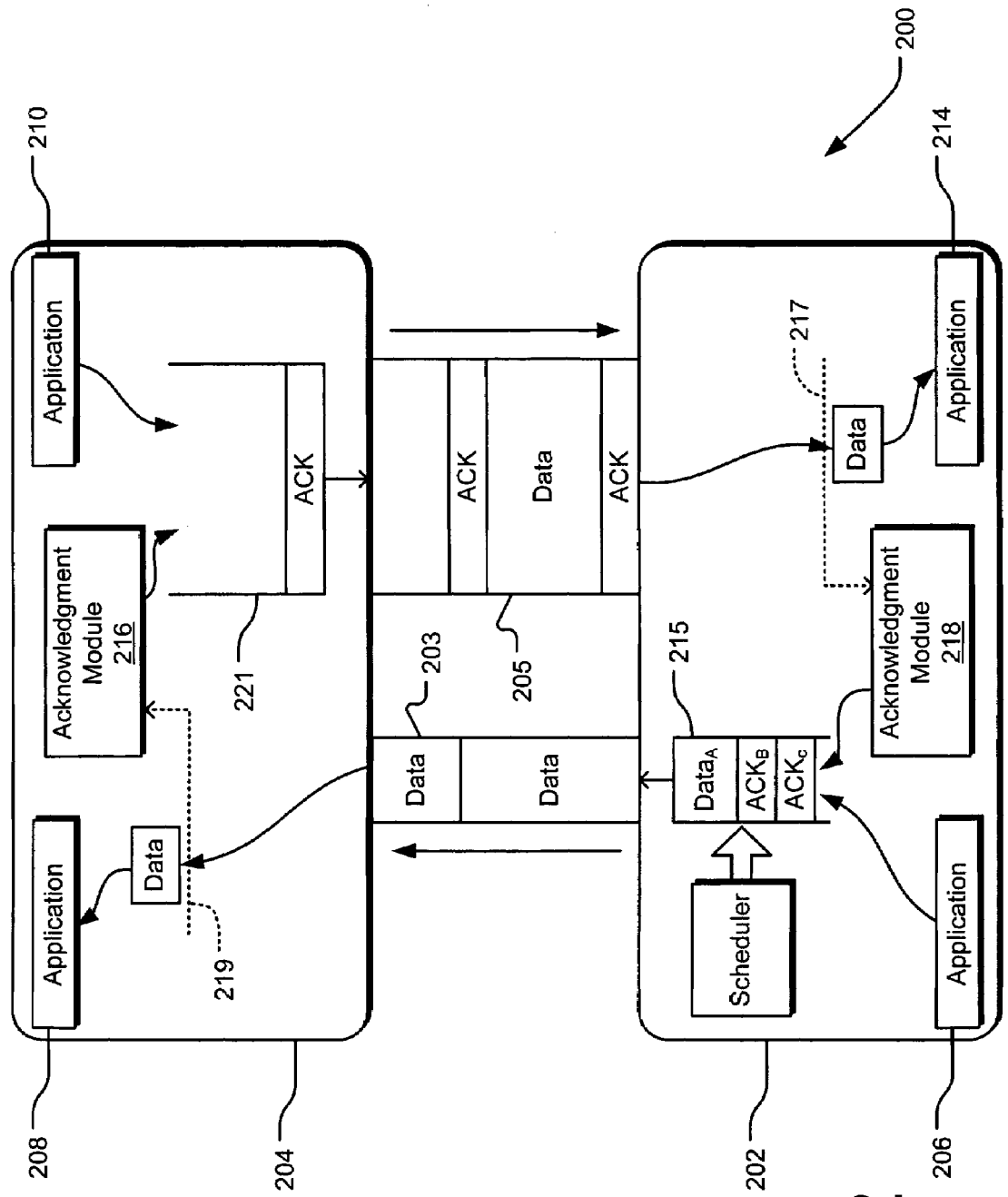
FIG. 2 illustrates an exemplary system having multi-stream acknowledgement scheduling, before a reordering operation.

FIG. 2 illustrates an exemplary system 200 having multi-stream acknowledgement scheduling, before a reordering operation. An uploading source 202 is coupled over a network (e.g., the Internet) to a downloading source 204. The uploading source 202 is executing an application 206 that is uploading data packets to an application 208 in the downloading source 204 (e.g., representing two sides of the digital image uploading operation) in an upload stream A. A saturated upload link 203 is shown with data packets from arbitrary streams. Likewise, the downloading source 204 is executing an application 210 that is downloading data packets to an application 214 in the uploading source 202 (e.g., representing two sides of the digital video downloading operation) in a download stream B. A less-than-saturated download link 205 is shown, with acknowledgement and data packets from arbitrary streams.

As each data packet is received by a given source, the data packet is marked with a timestamp (or sequence number), which can indicate the order in which the data packet was received relative to other packets. An acknowledgement module 216 in the network stack of the downloading source 204 and an acknowledgement module 218 in the network stack of the uploading source 202 detect (shown by dotted arrows 217 and 219) the receipt of data packets in one or more streams. The received data packet is classified to identify its stream (e.g., a TCP connection), if any. If the data packet is part of a connection-related stream, an acknowledgement packet for the received data packet is sent to a connection-related transmit queue of the receiving source to be returned to the originating source. If the data packet in not part of a connection-specific stream, an acknowledgement packet for the received data packet is sent to a non-connection-related transmit queue of the receiving source to be returned to the originating source. In a non-connection related flow, the application is generally responsible for handling any acknowledgements, if any. In the uploading source 202, a connection-related transmit queue 215 is shown, and in the downloading source 204, a connection-related transmit queue 221 is shown.

The transmit queue 215 includes, in order from front to back, a data packet of a stream A, an acknowledgement packet of a stream B, and an acknowledgement packet of stream C. The other data packets in the upload link 203 are from other streams. As the uploading source 202 transmits the data packet onto the upload link 203, the acknowledgement packets will be delayed until the data packet transmission is completed. Meanwhile, the downloading source 204 is not transmitting a subsequent data packet in stream B until it receives the corresponding acknowledgement packet for stream B, which is stuck in the transmit queue 215 of the uploading source 202.

Figure 3:
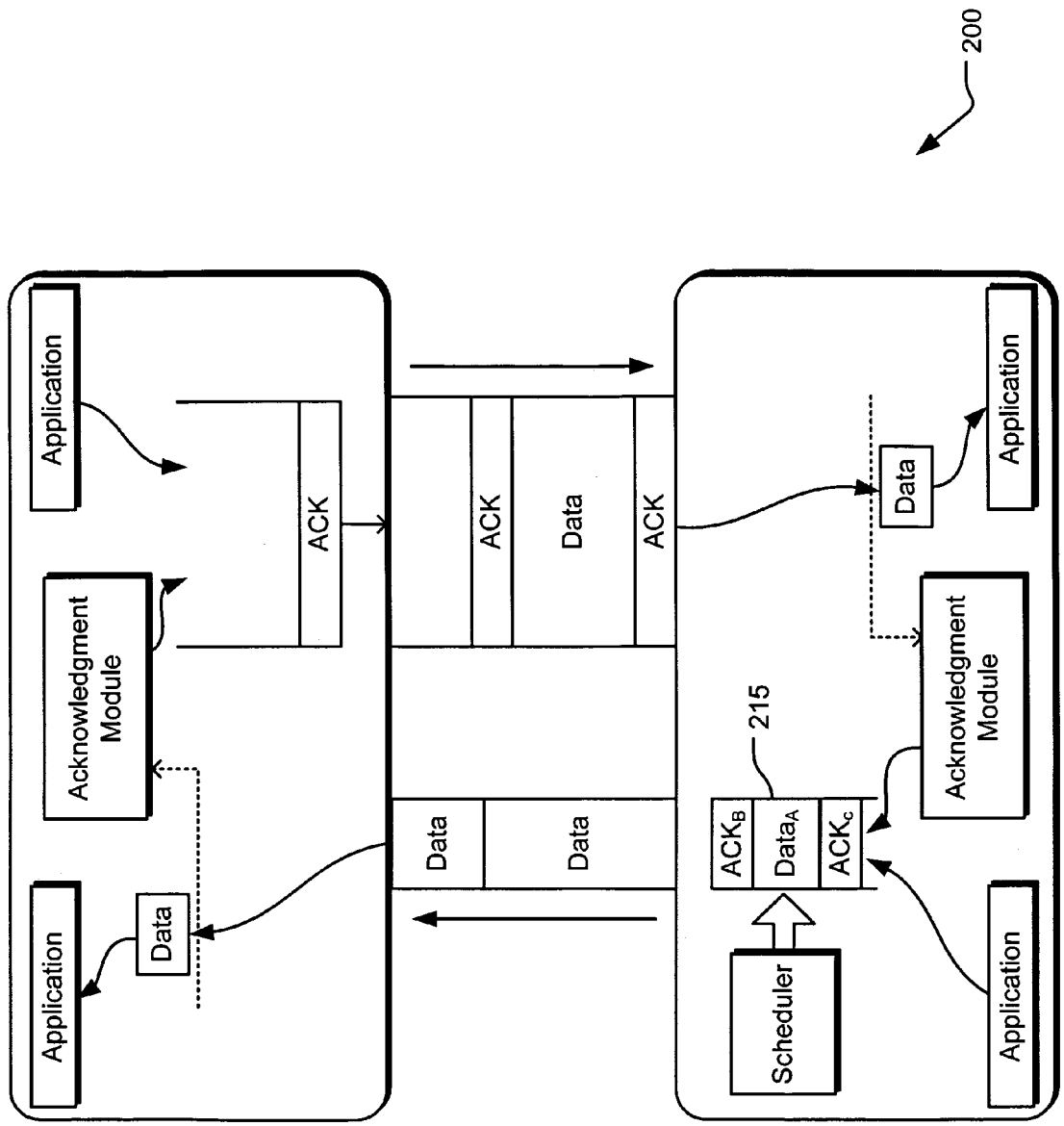
FIG. 3 illustrates the exemplary system of FIG. 2 having multi-stream acknowledgement scheduling, after a reordering operation.

FIG. 3 illustrates the exemplary system 200 having multi-stream acknowledgement scheduling, after a reordering operation. As shown, the data packet and one of the acknowledgement packets have been reordered in the transmit queue 215. The reordering was executed responsive to satisfaction of a reordering condition set to maintain a desired balance between the uploading rate and the downloading rate. For example, the uploading source 202 may be configured to favor the downloading rate to some degree, or vice versa.

The reordering condition is based on a relative acknowledgement priority parameter (RAP), which reflects how much of a source's transmit rate can be sacrificed to returning acknowledgements in another stream in order to improve the source's receive rate. For example, a relative acknowledgement priority parameter equaling "1" represents that acknowledgement packets always get higher priority over data packets. For example, it can be said that the acknowledgements are allocated a fraction of the transmit rate $R_T$ (e.g., $RAP*R_T$) and data is allocated the remaining fraction of the transmit rate $R_T$ (e.g., $(1-RAP)*R_T$). This relative acknowledgement priority parameter can be tuned to provide a desired tradeoff between transmit and receive rates of multi-streamed communications. In one implementation, a relative acknowledgement priority parameter of $\frac{1}{8}$ is found to provide acceptable results, although other parameter values are also contemplated. In this case, the parameter indicates that ⅛ of the transmit rate may be allocated to reordered acknowledgement packets.

An alternative RAP parameter may be based on a ratio of acknowledgements to data on the link. In this approach, the acknowledgments are allocated a portion of the transmit rate $R_T$ (e.g., $R_T*RAP/(1+RAP)$) and data is allocated the remaining portion of the transmit rate $R_T$ (e.g., $R_T*(1/(1+RAP))$).

Figure 4:
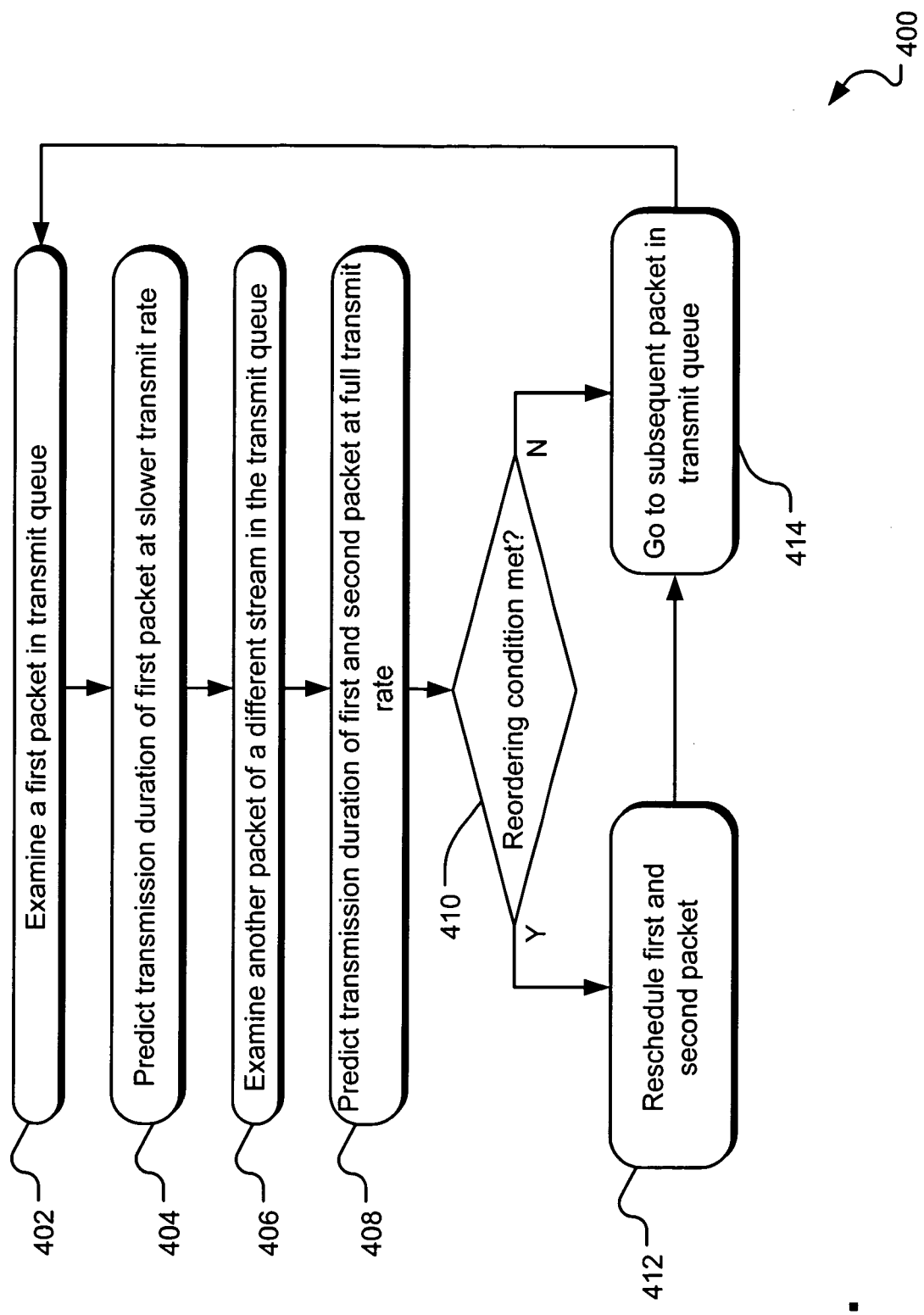
FIG. 4 illustrates operations for exemplary multi-threaded acknowledgement scheduling.

FIG. 4 illustrates operations 400 for exemplary multi-threaded acknowledgement scheduling at a first node, wherein the first node is receiving data packets from second node and is transmitting data packets to the second node or some other node. A first examining operation 402 examines a first packet in a transmit queue, wherein the first packet need not be the packet at the front of the transmit queue but is merely farther forward in the transmit queue than other packets examined in the operations 400. The examining operation 402 records the TCP connection of the first packet, the size of the packet ($P_1$), and the transmit rate ($R_T$) of the communications flow associated with the transmit queue.

On the basis of this information, a prediction operation 404 computes the transmission duration of the first packet (i.e., the time it would take to transmit the complete first packet) at a "discounted" transmit rate, $R_D$, which is determined on the basis of the relative acknowledgement priority parameter, RAP. Generally, the discounted transmit rate represents the partial transmit rate experienced by the data packet if a portion of the transmit rate were sacrificed to upgrade the priority of certain acknowledgement packets. Therefore, the discounted transmit rate is slower than the transmit rate of the communications flow. In one implementation, the discounted transmit rate is computed as follows, although other algorithms are contemplated:

$$R_D = (1-RAP)R_T$$

Therefore, the predicted transmission duration, $D_1$, of the first packet at the discounted transmit rate may be computed using:

$$D_1 = \frac{P_1}{R_D}$$

Another examining operation 406 examines a second packet in the transmit queue, this second packet being queued to transmit later in time than the first packet. The second packet may be ordered directly behind the first packet or at some later position in the transmit queue. The examining operation 406 records the TCP connection of the second packet, the size of the packet ($P_2$), and the transmit rate ($R_T$) of the communications flow associated with the transmit queue. If the second packet is in the same stream as the first packet, another packet is selected and examined until a packet in a different stream is located.

On the basis of this information, a prediction operation 408 computes the transmission duration of the first packet and the second packet (i.e., the time it would take to transmit both the first and second packets) at the standard transmit rate, $R_T$. Therefore, the predicted transmission duration, $D_2$, of the first and second packets at the standard transmit rate may be computed using:

$$D_2 = \frac{(P_1 + P_2)}{R_T}$$

As tested by decision operation 410, if $D_2 \leq D_1$ (a reordering condition), then the second packet can be rescheduled to be transmitted from the transmit queue ahead of the first packet in rescheduling operation 412. If the second packet is an acknowledgement packet, the reordering decreases the acknowledgement latency from the first node and increases the rate at which the first node receives data from the second node. Thereafter, a continuation operation 414 restarts processing with a subsequent packet in the transmit queue.

In another implementation, the first examining operation 402 examines a first packet and a second packet in the transmit queue, wherein the first packet need not be the packet at the front of the transmit queue but is merely farther forward in the transmit queue than other packets examined in the operations 400. The examining operation 402 records the TCP connection of the first and second packets, the sizes of the packets ($P_1$ and $P_2$), and the transmit rate ($R_T$) of the communications flow associated with the transmit queue. Therefore, the predicted transmission duration, $D_1$, of the first and second packets at the discounted transmit rate may be computed using:

$$D_1 = \frac{(P_1 + P_2)}{R_D}$$

In this implementation, the examining operation 406 examines a third packet in the transmit queue. The examining operation 406 records the TCP connections of the third packet, the size of the packet ($P_3$), and the transmit rate ($R_T$) of the communications flow associated with the transmit queue. If the third packet is in the same stream as either the first or second packet, another packet is chosen and examined until a packet in a different stream is located.

On the basis of this information, a prediction operation 408 computes the transmission duration of the first packet, the second packet, and the third packet at the standard transmit rate, $R_T$. Therefore, the predicted transmission duration, $D_2$, of the first, second and third packets at the standard transmit rate may be computed using:

$$D_2 = \frac{(P_1 + P_2 + P_3)}{R_T}$$

As tested by decision operation 410, if $D_2 \leq D_1$ (a reordering condition), then the either third packet can be rescheduled to be transmitted from the transmit queue ahead of the second packet in rescheduling operation 412. If the second packet is an acknowledgement packet, the reordering decreases the acknowledgement latency from the first node and increases the rate at which the first node receives data from the second node. Thereafter, a continuation operation 414 restarts processing with a subsequent packet in the transmit queue.

In an alternative implementation, the specific reordering condition described above for two packets may not be satisfied but reordering can still be performed if a third packet contributes to satisfy an alternative reordering condition. If $D_2 > D_1$, then the packets P1 and P2 are not reordered, but the difference between $D_1$ and the actual time to transmit $P_1$ (which is $P_1/R_T$) may be referred to as a "carry", which can be combined with comparisons of a subsequent packet pair (or set of packets) to satisfy the alternative reordering condition. The carry may be computed using:

$$\Delta = D_1 - \frac{P_1}{R_T} = \frac{P_1}{R_D} - \frac{P_1}{R_T}$$

For example, consider packets of sizes $P_1$, $P_2$, and $P_3$ traveling in order through a transmit queue (i.e., $P_1$ is scheduled to transmit first, then $P_2$, then $P_3$), none of which satisfy the $D_2 \leq D_1$ reordering condition. Nevertheless, the difference ($\Delta_1$) between the $D_1$ for packet $P_1$ and the $P_1/R_T$ for $P_1$ and the difference between $D_1$ for packet $P_2$ and the $D_2$ for $P_2$ and $P_3$ can still justify a reordering—if ($D_2-\Delta_1$) is not greater than the $D_1$ for $P_2$, then $P_3$ can be reordered in front of $P_1$ or $P_2$. It should be understood, however, that $P_1$ may already be transmitted at this point, so that only a reordering of $P_3$ with $P_2$ is feasible.

In yet another implementation, the target receive rate for the receiving node can impact reordering. For example, it may be possible to reorder acknowledgement packets at the receiving node in such a way as to exceed the receive rate of the flow, thereby creating a bottleneck in the transmit queue in the transmitting node, referred to as queuing latency. This result is generally not desirable. Therefore, it may be beneficial to incorporate considerations of the receive rate into the reordering condition.

In one implementation, an acknowledgement packet indicates an amount A of data the receiving node is acknowledging. The indicated amount of data ("acknowledgement amount") informs the transmitting node that it is free to transmit at least A more data for the related stream. As such, the acknowledgement amounts of multiple streams can be monitored to roughly predict amount of data per second to be transmitted by the transmitting node in response to receipt of acknowledgement packets. This predicted transmit rate of the transmitting node is effectively the receive rate of the connection-specific flow in the receive link, and the acknowledgements from the receiving node can be managed to prevent the predicted transmit rate of the transmitting node from exceeding the receive rate of the connection-specific flow in the receive link.

Receive rate limiting can be combined with implementations of acknowledgment scheduling described herein to further improve overall communication performance. For example, the predicted transmission duration of an acknowledgement packet, where the size of the packet $P_1$, is represented by $$D_1^{Tx} = \frac{P_1}{R_D}$$

and an effective receive duration $D_1^{Rx}$ attributed to a first acknowledgement packet equals the acknowledgement amount $A_1$ divided by the download receive rate $R_R$ from the transmitting node to the receiving node or $$D_1^{Rx} = \frac{A_1}{R_R}$$

The full rate component $D_2$ of two acknowledgement packets is represented by $$D_2 = \max\left(\frac{P_1}{R_T}, D_1^{Rx}\right) + \max\left(\frac{P_2}{R_T}, D_2^{Rx}\right)$$

Or in an alternative implementation by $$D_2 = \max\left(\frac{P_1 + P_2}{R_T}, D_1^{Rx} + D_2^{Rx}\right)$$

A reordering condition of $D_2 \leq \max(D_1^{Tx}, D_1^{Rx})$ may then be applied.

The exemplary hardware and operating environment of FIG. 5 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, scheduler module, the decision block, and other modules may be incorporated as part of the operating system 35, application programs 36, or other program modules 37. The packet size, transmission durations and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a personal computer. Other embodiments are therefore contemplated.

What is claimed is:

1. A method of controlling network traffic between a first node and a second node, the method comprising:
   maintaining a transmit queue for a communications flow of the first node, the transmit queue containing a first packet associated with a first stream in the communications flow and a second packet associated with a second stream in the communications flow, the first packet being ordered ahead of the second packet in the transmit queue; and
   reordering the first packet and the second packet in the transmit queue, if the first packet and the second packet satisfy a reordering condition, wherein at least one of the first and second packets is an acknowledgement packet acknowledging an amount of data received in a receiving communications flow, the receiving communications flow has a receive rate, and the reordering condition is satisfied if the amount of data acknowledged by the at least one of the first and second packets is predicted not to exceed the receive rate.

2. The method of claim 1 wherein the communications flow is associated with a transmit rate from the first node and the reordering condition is dependent upon the transmit rate.

3. The method of claim 1 wherein the communications flow is associated with a transmit rate from the first node and further comprising:
   predicting a transmission duration of both the first and second packets transmitted at the transmit rate associated with the transmit queue;
   predicting a transmission duration of the first packet transmitted at a rate slower than the transmit rate of the communications flow.

4. The method of claim 3 wherein the reordering condition is satisfied if the predicted transmission duration of the first and second packets at the transmit rate is less than the predicted transmission of the first packet at the slower rate.

5. The method of claim 1 wherein the second packet is smaller than the first packet.

6. The method of claim 1 wherein the second packet is an acknowledgement packet.

7. The method of claim 1 wherein the second packet is a data packet.

8. The method of claim 1 wherein the transmit queue includes a third packet in the communications flow, the third packet not being associated with the first stream, and further comprising:
   predicting a transmission duration of the first, second, and third packets transmitted at a transmit rate associated with the transmit queue;
   predicting a transmission duration of the first packet transmitted at a rate slower than the transmit rate of the communications flow.

9. The method of claim 8 wherein the reordering condition is satisfied if the predicted transmission duration of the first, second, and third packets at the transmit rate is less than the predicted transmission of the first packet at the slower rate.

10. The method of claim 1 wherein the transmit queue includes a third packet in the communications flow and further comprising:
    predicting a transmission duration of the second and third packets transmitted at a transmit rate of the communications flow;
    predicting a transmission duration of the second packet transmitted at a rate slower than the transmit rate of the communications flow, wherein the reordering condition is satisfied if the predicted transmission duration of the second and third packets at the transmit rate is less than the predicted transmission duration of the second packet at the slower rate minus a carry amount by which a predicted transmission duration of the first packet differs from a predicted transmission duration of the first packet at the slower rate.

11. A computer-readable medium having computer-executable instructions for performing a computer process implementing the method of claim 1.

12. A communications node that controls network traffic with a second node, the communications node comprising:
- a transmit queue for a communications flow of the communications node, the transmit queue containing a first packet associated with a first stream in the communications flow and a second packet associated with a second stream in the communications flow, the first packet being ordered ahead of the second packet in the transmit queue; and
- a scheduler that reorders the first packet and the second packet in the transmit queue, if the first packet and the second packet satisfy a reordering condition, the communications flow is associated with a transmit rate from the communications node and the scheduler further predicts a transmission duration of both the first and second packets transmitted at the transmit rate associated with the transmit queue and a transmission duration of the first packet transmitted at a rate slower than the transmit rate of the communications flow, wherein the reordering condition is satisfied if the predicted transmission duration of the first and second packets at the transmit rate is less than the predicted transmission duration of the first packet at the slower rate.

13. The communications node of claim 12 wherein the communications flow is associated with a transmit rate from the communications node and the reordering condition is dependent upon the transmit rate.

14. The communications node of claim 12 wherein the second packet is an acknowledgement packet.

15. The communications node of claim 12 wherein the second packet is a data packet.

16. The communications node of claim 12 wherein the transmit queue includes a third packet in the communications flow, the third packet not being associated with the first stream, and the scheduler farther predicts a transmission duration of the first, second, and third packets transmitted at the transmit rate associated with the transmit queue and a transmission duration of the first packet transmitted at a rate slower than the transmit rate of the communications flow.

17. The communications node of claim 16 wherein the reordering condition is satisfied if the predicted transmission duration of the first, second, and third packets at the transmit rate is less than the predicted transmission of the first packet at the slower rate.

* * * * *